April 26, 1960　　　T. H. CHAMBERS　　　2,934,661
TRANSDUCER MOUNTING
Original Filed April 19, 1949　　　2 Sheets-Sheet 1
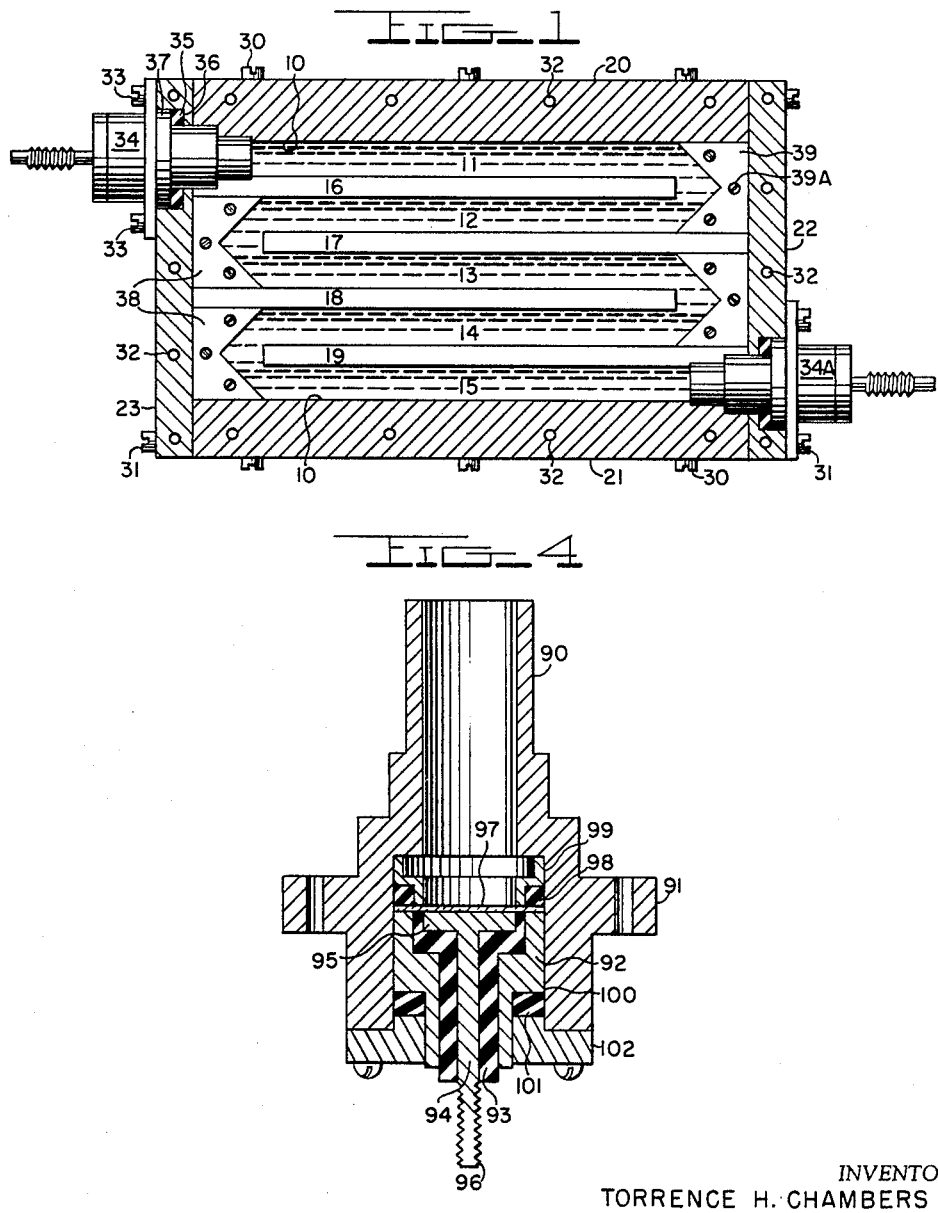
INVENTOR
TORRENCE H. CHAMBERS
BY
ATTORNEYS

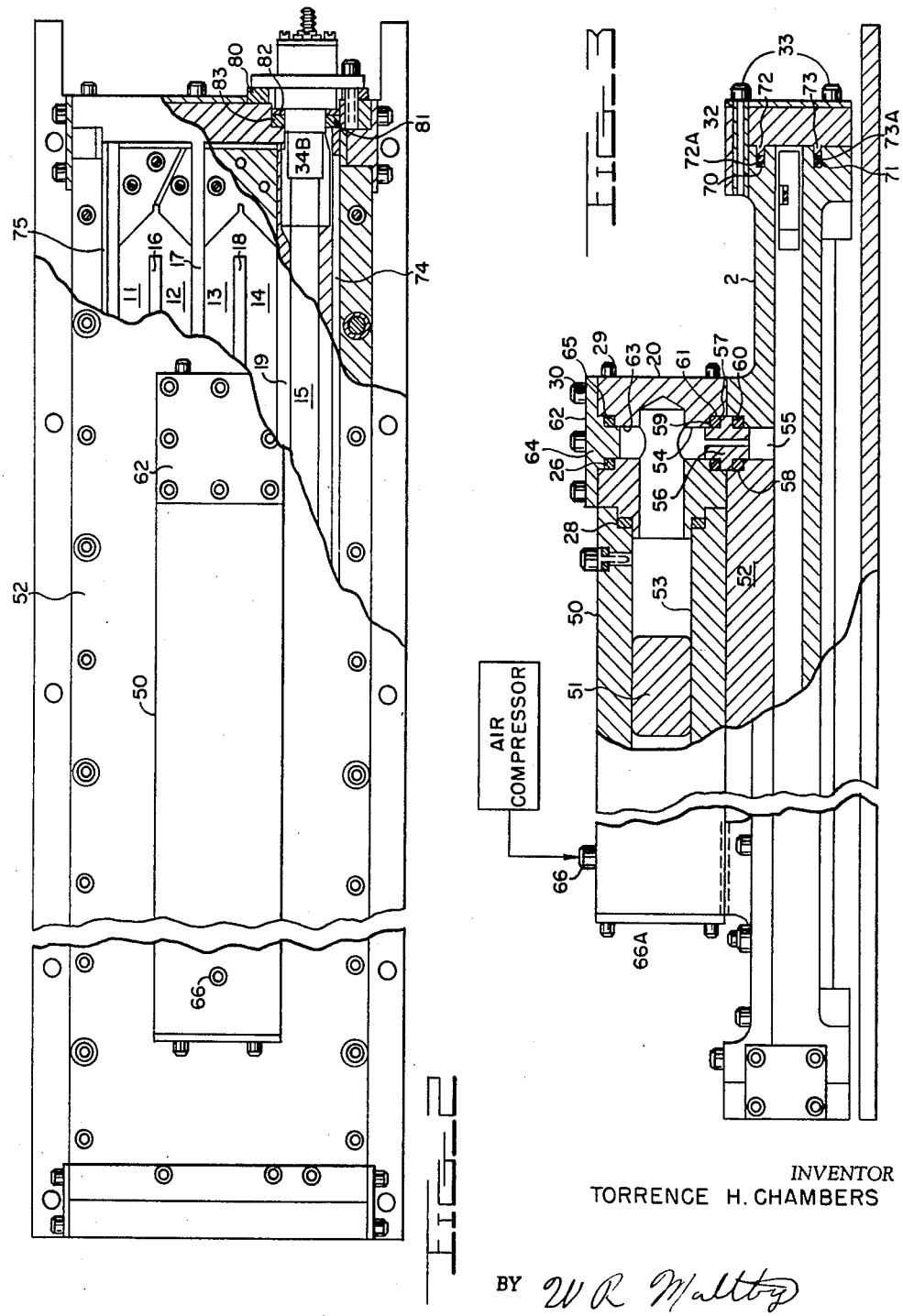

United States Patent Office 2,934,661
Patented Apr. 26, 1960

2,934,661

TRANSDUCER MOUNTING

Torrence H. Chambers, Washington, D.C.

Original application April 19, 1949, Serial No. 88,471. Divided and this application June 21, 1956, Serial No. 592,999

3 Claims. (Cl. 310—9.4)

(Granted under Title 35, U.S. Code (1952), sec. 266)

This application is a division of application Serial No. 88,471, filed April 19, 1949, now Patent No. 2,861,246.

The invention described herein may be manufactured and used by or for the Government of the United States of America for governmental purposes without the payment of any royalties thereon or therefor.

This invention relates in general to delay lines, and more specifically to improved crystal mounting structure for pressurized delay lines.

In particular the invention is concerned with crystal mountings for the type of delay line which finds extensive use in moving target radar indicators wherein each echo signal is subjected to a time delay equal to the pulse repetition period of the transmitter.

In general, delay lines used in such systems consist of a compressional wave transmitting medium confined between an electromechanical driver and reproducer. The driver and reproducer are usually piezoelectric crystals, while the transmitting medium is in most cases mercury.

In operation, the electrical signal to be delayed is applied to the driver element causing the same to vibrate, mechanically. The mechanical vibrations thus produced are in turn propagated as a compressional wave through the transmitting medium to the reproducer element where the delayed mechanical vibrations are reconverted into electrical vibrations. The electrical signal produced at the reproducer is of the same character as that applied to the driver, but is delayed in time by an interval equal to the time required for the compressional wave to travel through the transmitting medium.

While in the past delay lines of the same general character as above described have been widely used in the art, experience has shown that the same frequently undergo both momentary and sustained interruptions in their operativeness when the line is subjected to shock or vibration such as encountered in various mobile installations and particularly in installations aboard sea going vessels.

It is accordingly an object of this invention to provide a rugged, reliable, crystal mounting for a fluid electrical delay line.

It is another object of this invention to provide an improved crystal mounting for a pressurized fluid electrical delay line capable of substantially uninterrupted operation under severe conditions of shock and vibration.

Other objects and features of the present invention will become apparent upon a careful consideration of the following detailed description when taken together with the accompanying drawings, in which—

Fig. 1 is a simplified plan section of an elementary device incorporating one embodiment of the present invention, Fig. 2 is a partially cut-away top elevational view showing a pressurized delay line incorporating the present invention, Fig. 3 is a partially cut-away side elevational view of the apparatus shown in Fig. 2, and Fig. 4 is an enlarged sectional view of a typical embodiment of the present invention.

With reference now to Fig. 1, a delay line is in the form of a tank, and comprises a flat base plate 10 preferably made of stainless steel or the like. The upper face of the base plate is divided, preferably by milling, into a plurality of similar longitudinal, liquid containing channels 11 through 15, the sides of which are defined by a plurality of septa 16 through 19 formed in the milling operation. Attached to the side faces of the base plate 10, such as by machine screws 30, is a pair of side plates 20 and 21. Similarly attached to the ends of the base plate 10, again such as by machine screws 31, is a pair of end plates 22 and 23. The side and end plates 20—21 and 22—23, respectively are bolted together by screws 31 to provide a rigid tank like structure for holding the liquid filling of the delay line. The side and end plates 20—21 and 22—23 are tapped, as shown at 32, at regular intervals along their upper edges to permit the attachment of a top plate (not here illustrated) for the line.

The purpose of dividing the delay tank into several longitudinal channels as is quite apparent from the drawings is to conserve space. That is, by connecting the several channels in folded back relation or in tandem so to speak a comparatively long delay line can be obtained from a relatively short tank. For this reason the adjacent septa abut opposite end walls 22 and 23. In particular alternate septa 16 and 18 are milled to permit intimate contact at their left hand ends with the left hand end wall 23. Their right hand ends, however, are terminated short of, or in spaced relation with the right hand wall 22. Similarly, septa 17 and 19 are milled to lie in intimate contact at their right hand ends with the right hand wall 22. Their left hand ends, however, terminate short of, or in spaced relation to the left hand end wall 23.

The line is thus divided into five rectangular cross-sectional channels 11 through 15 of equal width, length and depth.

Inserted in the left hand end wall 23, in the upper end thereof as viewed in this figure, is a transmitting crystal only the holder for which, generally designated at 34, is visible in this figure. The transmitting crystal holder 34 extends through the end wall 23 and communicates with the first channel 11 of the line and is secured to end plate 23 by suitable machine screws 33. To provide a liquid seal in the line at the point of entrance of the crystal holder 34 a suitable annular rubber gasket 35 is inserted in the annular space formed by the annular recess 36 cut in the end plate 23 and shoulder 37 formed on the holder 34.

From the foregoing it will be apparent that a compressional wave produced by vibration of the transmitting crystal 34 will travel to the right, as viewed in Fig. 1, through the mercury in channel 11. In order to reflect the wave back and along the next adjacent channel 12, a right angle corner reflector 39 is provided and as illustrated in this figure is so mounted, as by machine screws 39A that its apex is aligned with the septa 16. The right angle facing on this corner reflector extend respectively to septa 17 and side plate 20. Similar reflectors, typified at 38 are used to join channels 12 and 13, 13 and 14, and 14 and 15 in folded relation. Thus a compressional wave originating at the transmitting crystal is reflected in succession first to the left and then to the right successively through the several channels 11 through 15 until it reaches the receiver crystal 34–A. The receiving crystal 34–A is mounted on the right hand end wall 23 and communicates with the last channel 15 in the same manner as the transmitting crystal 34.

The electrical signal reproduced at the receiving crystal is of the same character as that applied to the transmitting crystal but is delayed by a time interval equal to the time required for the compressional wave to propagate through the mercury filled channels comprising the line.

While the above delay lines employing conventional prior art crystal holders are in general very satisfactory for use in stationary installations or in installations in which little or no shock or vibration is encountered; such devices are wholly unreliable for shipboard use. I have found the inadequacy of the delay line results from a tendency of the mercury to pull-away from intimate contact with the crystals when the line is subjected to shock and vibration. This effect results in both momentary and sustained interruptions in the operation of the line.

As previously noted it is a major object of this invention to provide a line capable of substantially continuous operation under severe conditions of shock and vibration. To this end I have constructed a delay line as better illustrated in Figs. 2 and 3 wherein the mercury or liquid filling of the line is held in the line under pressure. Referring now to Figs. 2 and 3, it will be observed that this pressurized feature is accomplished through the use of a stand pipe 50 having a metallic piston 51 movable therein. Such a pressurized arrangement imposes special requirements upon the crystal and the mounting thereof to retain sensitivity and vibration absorption despite presence of sufficiently rigid closure to resist the pressure.

In the pressurized delay line, the stand-pipe 50 is preferably made of rectangular stock bolted or otherwise secured to the top plate 52 covering the line and contains an axial cylindrical bore 63 in which the piston 51 rides. The stand-pipe communicates with the cavity or channels comprising the line through a pair of registering bores 54 and 55 formed in the stand pipe 50 and the top plate 52 respectively. The junction of the bores 54 and 55 is lined with a metallic tubular insert 56 which carries a flange 57 adapted to snugly fit into adjacent circular recesses 58 and 59 formed in the abutting faces of the stand pipe and top cover plate of the line. A pair of circular rubber gaskets 60 and 61 are fitted into the recesses 58 and 59 on opposite sides of the flange 57 to provide a liquid tight seal at the junction. The insert 56 is preferably made with a small internal diameter operative to prevent vibrational resonance occurring in the stand pipe 50 from being transmitted to the mercury in the main delay tank.

In other words the small bore in the insert 56 functions to mechanically decouple the mercury in stand pipe 50 from that in the delay line tank.

A plate 62 is provided to cover a filling port 63 formed in the stand pipe over the registering bores 54 and 55. Plate 62 is bolted to the stand-pipe and is provided with a cyclindrical raised portion 64 adapted to snugly fit into the filler bore 63. A suitable circular rubber gasket 65 is provided to effect a liquid seal for the filler plate.

In filling the line with mercury, plate 62 is removed and the line comprising the several channels 11 through 15, and the portion of the stand pipe to the right of the piston 51 is completely filled with mercury. The plate 62 is then bolted back in place and air pressure is applied to the air inlet 66 to urge the piston to the right thereby compressing the mercury in the line.

The use of air pressure for purposes of pressurizing the line is only exemplary and other means for urging the piston to the right can be employed. For example, a compression spring inserted between piston 51 and end plate 66A of the stand pipe 50 could be used if desired. In any event best operation of the line can be secured under pressure of 35 pounds per square inch or more depending upon the degree of shock and vibration to which the line is subjected and upon the effective height of the head of mercury or length of the line.

Interruption or failure in the operation of a liquid delay line in addition to that caused by ordinary shock and vibration can also arise in response to a sharp blow dealt to the line itself such as by tapping the same with a screw-driver. This is known as the "screw-driver" effect and is believed to cause failure of the line by formation of minute bubbles of air in the mercury. These bubbles are possibly formed by the rarefaction of the mercury due to the sonic wave traveling out from the point of impact causing air dissolved in the mercury to be released.

To avoid this difficulty the line may be first evacuated and then filled with mercury, or alternatively out gassed mercury may be used, or both an evacuated line and out gassed mercury may be used.

In constructing the line care should be taken to provide a liquid tight pressure seal at all junctions of the top, side and end plates. To this end, each end, as shown in Fig. 3, of the top and bottom plates are recessed as at 70 and 71 respectively, to permit the receipt of a pair of rubber gaskets 72a and 73a and a pair of mating raised ribs 72 and 73 formed in the face of the corresponding end plate 22 or 23. For similar reasons the side plates may be provided with longitudinal recesses, as shown in Fig. 2, 74 and 75 formed therein while the top cover plate can be provided with mating ribs.

For shock mounting, the crystal holders, typified at 34–B in Fig. 2, are provided with a rubber washer as shown at 80 interposed between the end wall of the tank and crystal holder flange.

To provide a liquid seal for the crystal holders a second rubber gasket 81 is inserted between the shoulder 82 of the crystal holder and the recess 83 formed in the end wall of the line.

For convenience in replacement the crystal and crystal mount are made as a single integral unit as illustrated in cross section in Fig. 4 to which reference is now made. The crystal holder as herein illustrated comprises an outer generally tubular shell 90 having a mounting flange 91 integrally formed on the outside thereof. Shell 90 is internally bored with a large diameter adjacent the mounting end thereof and a smaller diameter at the open end thereof. The crystal mount comprises an outer metallic shell 92, an insulating insert 93 press-fitted therein and finally a crystal electrode 94 press-fitted into the insulating insert 93. Electrode 94 is terminated in a disc like plate 95 at one end thereof and a threaded section 96 on the other end thereof. The threaded end is provided for the purpose of making a wired input or output connection to the crystal. A flat piezoelectric crystal 97 is cemented to the disc end of the electrode 94 and extends over the edges thereof as shown in the figure.

In assembly, the crystal, the electrode 94, the insulating insert 93 and the retaining shell 92 are all mounted as a unit. A rubber sealing gasket 98 and metallic retaining ring 99 are inserted within the outer shell 90 as shown. The metal retaining ring 99 is formed with two diameters as shown to provide a shoulder thereon whereby pressure within the line forces the ring 99 down tighter against the gasket 98 providing a better seal under pressure.

To provide shock mounting, the retaining shell 92 is recessed as shown at 100 to permit receipt of a circular rubber gasket 101. A cover plate 102 is provided with a mating annular boss adapted to fit into the recess 100 and completely confine the gasket 101. Plate 102 is bolted to outer shell 90 to permit easy removal of the crystal cartridge and thereby easy replacement of the same.

While I have shown and described only certain and specific embodiments of the present invention, it must be understood that I am fully aware of the many modifications possible thereof. Therefore this invention is not to be limited except as herein indicated by the scope of the disclosure.

What is claimed is:

1. A crystal holder comprising a hollow shell member having an inner surface, a crystal mount including an electrode terminating in a plate disposed on a first surface of the crystal mount, said crystal mount having a second surface located opposite said plate, said crystal mount being disposed within said hollow shell member and axially movable relative to the inner surface of the hollow shell member, a piezoelectric crystal transversely supported on said plate, a first flexible member placed on the face of said piezoelectric crystal around the perimeter thereof, a retaining ring disposed within said hollow shell member and fitted over said first flexible member, said retaining ring being free to move axially over a limited distance within said hollow shell member, a second flexible member placed on said second surface of said crystal mount, and means for urging said retaining ring tight against said first flexible member and said second flexible member tight against said second surface of said crystal mount.

2. A crystal holder comprising a hollow outer shell member having an inner surface and internally recessed to a large diameter at one end thereon, the recessed portion forming an internal shoulder at the junction thereof with the unrecessed portion, an inner shell member having an insulating insert press-fitted therein, an electrode terminating in a plate press-fitted in said insulating insert such that said plate is disposed along a first surface of the inner shell member, said inner shell member having a second surface opposite said plate, a third surface of said inner shell member being engageable with the inner surface of said hollow outer shell member and axially movable relative thereto, a piezoelectric crystal transversely supported on said plate, a first flexible member placed on the face of said piezoelectric crystal around the perimeter thereof, a retaining ring disposed within the recessed portion of said hollow shell member and fitted over said flexible member, said retaining ring being free to move axially within the recessed portion of said hollow shell member, a second flexible member placed on said second surface of the inner shell member, and means urging said retaining ring tight against the internal shoulder, said first flexible member tight against the retaining ring, said piezoelectric crystal tight against said first flexible member, and said second flexible member tight against said second surface of said inner shell member.

3. A crystal holder comprising a hollow member having an inner surface and being internally recessed at one end thereon, the recessed portion of said hollow member forming an internal shoulder at the junction thereof with the unrecessed portion, a crystal mount including an electrode terminating in a plate disposed on a first surface of the crystal mount, said crystal mount having a second surface located opposite said plate, said crystal mount being disposed within said hollow member and axially movable relative to the inner surface of the hollow member, a crystal transversely supported on said plate, a first flexible member placed on the face of said crystal around the perimeter thereof, a ring internally recessed at one end thereof, the recessed portion of said ring forming an internal shoulder at the junction thereof with the unrecessed portion, said ring disposed within said hollow member and fitted over said first flexible member with the recessed portion of said ring located further from said first flexible member than the unrecessed portion, said ring being free to move axially within said hollow member, a second flexible member placed on said second surface of the crystal mount, and means for urging said ring tight against said first flexible member and said second flexible member tight against said second surface of the crystal mount.

References Cited in the file of this patent

UNITED STATES PATENTS

| | | |
|---|---|---|
| 1,401,024 | Wood | Dec. 20, 1921 |
| 2,430,013 | Hansell | Nov. 4, 1947 |
| 2,505,867 | Meunier | May 2, 1950 |
| 2,626,992 | Holman | Jan. 27, 1953 |
| 2,668,529 | Huter | Feb. 9, 1954 |